R. Cook,

Dinner Pail,

№ 34,243.  Patented Jan. 28, 1862.

Witnesses;
E. R. Cook
M. J. Cook

Inventor;
Ransom Cook

UNITED STATES PATENT OFFICE.

RANSOM COOK, OF SARATOGA SPRINGS, NEW YORK.

IMPROVED LUNCH-BOX.

Specification forming part of Letters Patent No. 34,243, dated January 28, 1862.

*To all whom it may concern:*

Be it known that I, RANSOM COOK, of Saratoga Springs, in the county of Saratoga and State of New York, have invented a new and useful combination and arrangement of apparatus to enable travelers, laborers from home, fishermen, and others conveniently to carry food and drink for a lunch, which I denominate a "lunch-case;" and I do hereby declare that the following is a full, clear, and exact description of the construction and arrangement of the same, reference being had to the annexed drawings, making a part of this specification, in which—

Figure 1:
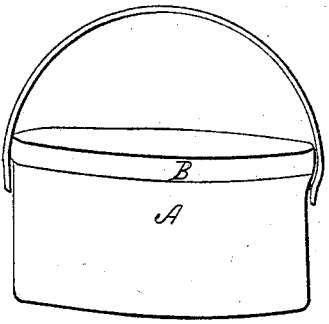
Figure 2:
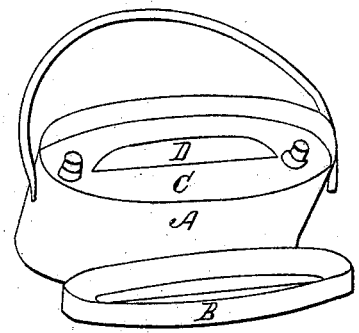
Figure 3:
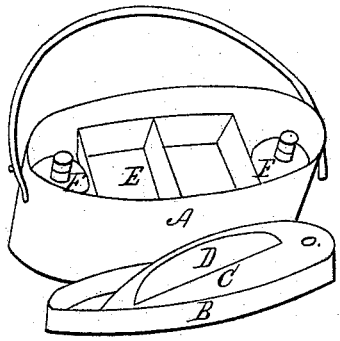
Figure 4:
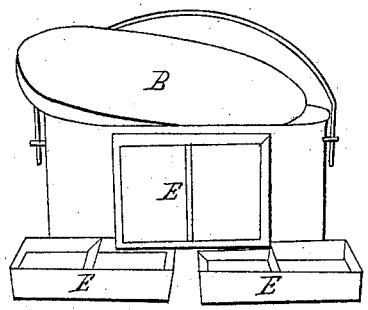
Figure 5:
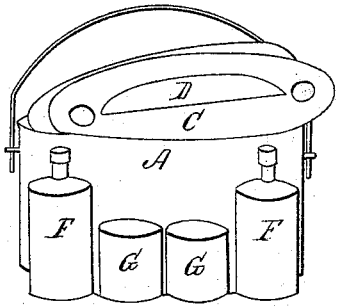

Figure 1 is an elevation giving an exterior view of the case. Fig. 2 is a view of the same with the outer cover removed and showing the inner cover through which the nozzles of the vessels for drink project, and also showing the rib or elevated plate attached to the inner cover. Fig. 3 is a view of the case with both covers removed and showing one of the dishes for food and the tops of both of the vessels for drink. Fig. 4 is intended to represent the dishes for food. Fig. 5 is intended to show the vessels for drink and the drinking-cups. In the two last views the case is used merely as a background.

In all the views the case inclosing the apparatus is marked A, the outer cover B, the inner cover C, the rib or elevated plate on the inner cover D, the dishes for food E E E, the vessels for drink F F, and the drinking-cups G G. The red lines in Fig. 3 indicate the upper edges of the partitions which separate the dishes for food from the vessels for drink.

In constructing this case of sufficient capacity to contain a lunch for two persons I make it about thirteen inches long and from five to six inches wide in the middle and of an oval or elliptical form. Its height should be from six to seven inches. The case and its furniture or apparatus may be made of tin or other suitable material. It has two transverse partitions, the upper edges of which are indicated by the red lines in Fig. 3. These partitions separate the dishes for food from the vessels for drink. They commence near the top and continue vertically to the bottom of the case. The dishes for food should be of such depth or thickness that the top of the last one should be even with the top of the partitions. In the middle of the case between the partitions are placed the dishes for food directly over each other, so that the one first placed in the case is covered by the bottom of the second one, the second one is covered by the bottom of the third one, and the third one is covered by the inner cover C. The cans or vessels for drink F F are set in the drinking-cups G G, and are placed one at each end of the case.

The dishes for food and the vessels for drink being filled are placed in the case as directed. The inner cover C is then to be placed over them all, the necks of the cans passing through it, as shown in Fig. 2. At each side of the rib or vertical plate D the knives and forks, wrapped in napkins, are to be placed. The outer cover is then to be put on, which, pressing upon the rib D, holds the inner cover and all below it in place. If preferred, this arrangement may be reversed so far as to put dishes for food at each end of the case and cans for drink in the middle of it. When eating, the outer cover, if inverted, may be used as a plate.

I claim—

A lunch-case composed of the dishes E E E, the vessels F F, the drinking-cups G G, the inner cover C, its rib D, with the case A, and the cover B, the whole constructed and arranged as set forth, for the purpose specified.

RANSOM COOK.

Witnesses:
 E. R. COOK,
 M. T. COOK.